United States Patent
Yoshida et al.

(10) Patent No.: US 9,418,704 B2
(45) Date of Patent: Aug. 16, 2016

(54) PROGRAM, RECORDING MEDIUM, AND REPRODUCING APPARATUS

(75) Inventors: Susumu Yoshida, Kawasaki (JP); Takuya Imaide, Fujisawa (JP); Toshihiro Kato, Tokyo (JP); Akinobu Watanabe, Fujisawa (JP); Naozumi Sugimura, Yokohama (JP); Nozomu Shimoda, Ninomiya (JP)

(73) Assignee: HITACHI MAXELL, LTD., Osaka (JP)

( * ) Notice: Subject to any disclaimer, the term of this patent is extended or adjusted under 35 U.S.C. 154(b) by 1322 days.

(21) Appl. No.: 10/939,916

(22) Filed: Sep. 9, 2004

(65) Prior Publication Data
US 2005/0086603 A1 Apr. 21, 2005

(30) Foreign Application Priority Data

Sep. 17, 2003 (JP) ................................. 2003-323900
Sep. 17, 2003 (JP) ................................. 2003-323905

(51) Int. Cl.
*H04N 9/80* (2006.01)
*G11B 27/10* (2006.01)
*G11B 20/10* (2006.01)
*G11B 27/32* (2006.01)
*G11B 27/34* (2006.01)

(52) U.S. Cl.
CPC .............. *G11B 27/105* (2013.01); *G11B 20/10* (2013.01); *G11B 27/329* (2013.01); *G11B 27/34* (2013.01); *G11B 2220/20* (2013.01)

(58) Field of Classification Search
USPC ............................. 386/95, 125, 126, 239–262
See application file for complete search history.

(56) References Cited

U.S. PATENT DOCUMENTS

| 5,864,870 | A * | 1/1999 | Guck |
| 6,275,827 | B1 * | 8/2001 | deVries et al. ................ 707/102 |
| 6,385,641 | B1 * | 5/2002 | Jiang et al. .................... 709/203 |
| 7,472,427 | B2 * | 12/2008 | Shimojima et al. ............. 726/31 |

(Continued)

FOREIGN PATENT DOCUMENTS

| JP | 11-161663 | 6/1999 |
| JP | 11-260045 A | 9/1999 |

(Continued)

OTHER PUBLICATIONS

Japan Patent Office (JPO) office action dated Oct. 16, 2007 for JPO patent application JP2003-323900.

(Continued)

*Primary Examiner* — Hung Dang
(74) *Attorney, Agent, or Firm* — Kilpatrick Townsend & Stockton LLP

(57) ABSTRACT

The problem to be solved is to make it possible to download via a network, efficiently manage, retrieve, and reproduce an external content associated with a content recorded on a recording medium. To solve the problem, a program is used which controls reproduction of information located on a recording medium and related information. The program includes the steps of: obtaining from the outside specific information associated with predetermined information recorded on a recording medium; and obtaining medium identification information located on a recording medium; wherein if the specific information has been obtained, a storage unit in a reproducing apparatus is controlled to associate the specific information with the medium identification information for storage.

10 Claims, 13 Drawing Sheets

(56) References Cited

U.S. PATENT DOCUMENTS

| | | | |
|---|---|---|---|
| 2001/0052133 A1* | 12/2001 | Pack et al. | 725/109 |
| 2002/0162120 A1* | 10/2002 | Mitchell | 725/135 |
| 2003/0041123 A1* | 2/2003 | Sato et al. | 709/219 |
| 2003/0152366 A1* | 8/2003 | Kanazawa et al. | 386/69 |
| 2003/0231861 A1* | 12/2003 | Yoo et al. | 386/46 |

FOREIGN PATENT DOCUMENTS

| | | | | |
|---|---|---|---|---|
| JP | 2001-307464 | | 11/2001 | |
| JP | P2001-307464 A | * | 11/2001 | G11B 27/10 |
| JP | 2002-074911 A | | 3/2002 | |
| JP | 2002-247526 A | | 8/2002 | |
| JP | 2003-281862 | | 10/2003 | |
| WO | WO 92/22983 | * | 12/1992 | H04N 5/781 |
| WO | WO 03/005207 | * | 1/2003 | G06F 12/14 |

OTHER PUBLICATIONS

Japan Patent Office (JPO) office action for JPO patent application JP2009-159410 (Feb. 16, 2010).

* cited by examiner

FIG. 1

| CONTENTS | DISK ID | SIGN | TEXT INFORMATION |
|---|---|---|---|
| A | 1234567890 | S | SUBTITLED (ENGLISH) |
| B | 7429514320 | V | SPECIAL IMAGE |
| C | 3333333333 | S | SUBTITLED (FRENCH) |
| D | 7429514320 | A | DUBBED (GERMAN) |
| E | 3333333333 | V | PREVIEW |
| ⋮ | ⋮ | ⋮ | ⋮ |

CONTENTS LIST

○ SELECT A DESIRED DISK ID.

1234567890

7429514320

3333333333

-----------

| CONTENTS | DISK ID | SIGN | TEXT INFORMATION | REPRODUCTION REQUIREMENTS |
|---|---|---|---|---|
| A | 1234567890 | S | SUBTITLED (ENGLISH) | UNRESTRAINT |
| B | 7429514320 | V | SPECIAL IMAGE | SPECIFIED DISK |
| C | 3333333333 | S | SUBTITLED (FRENCH) | UNRESTRAINT |
| D | 7429514320 | A | DUBBED (GERMAN) | UNRESTRAINT |
| E | 3333333333 | V | PREVIEW | 30 DAYS |
| ⋮ | ⋮ | ⋮ | ⋮ | ⋮ |

US 9,418,704 B2

PROGRAM, RECORDING MEDIUM, AND REPRODUCING APPARATUS

CLAIM OF PRIORITY

The present application claims priority from Japanese applications serial no. JP2003-323900 and serial no. JP2003-323905, both filed on Sep. 17, the contents of which are hereby incorporated by reference into this application.

BACKGROUND OF THE INVENTION

1. Field of the Invention

The present invention relates toga reproducing apparatus for reproducing information from a recording medium, a program used for reproduction, and a recording medium with the program recorded.

2. Description of the Prior Art

To manage contents recorded in a recording medium, in audio-visual equipment such as CD and DVD players, a method is devised to obtain information from a recording medium itself or network and produce content information. (Refer to Japanese Patent Laid-open No. 2001-307464, for example).

In recent years there has been a growing use of broadband networks. Besides information in small amounts, there are thus available more and more subtitle information for movie titles and more and more diversified contents such as images and audio.

SUMMARY OF THE INVENTION

Under the above-mentioned background, a method can be devised to download via a network and view and listen external contents that are associated with contents recorded in a recording medium, in audio-visual equipment using the so-called optical disc as a recording medium. In the above-mentioned examples of the related art, however, a method is provided for managing contents recorded in a recording medium, but no special consideration has been given to a method for managing external contents downloaded.

In addition, the storage capacity of a recording medium incorporated in a reproducing apparatus is limited, which necessitates the deletion of external contents downloaded.

In view of the foregoing, the present invention has been made and an object of the present invention is to perform an appropriate reproduction control by downloading via a network and efficiently managing an external content associated with a content recorded on a recording medium. Another object of the present invention is to provide a method for effectively utilizing the memory space of a storage unit in a reproducing apparatus without more time spent by a user.

To achieve the above-mentioned object, the present invention uses a program for controlling the reproduction of information located on a recording medium and related in formation, the program including: obtaining from an outside specific information associated with predetermined information recorded on a recording medium; and obtaining medium identification information located on a recording medium; wherein if specific information has been obtained, a storage unit in a reproducing apparatus is controlled to associate the specific information with the medium identification information for storage.

BRIEF DESCRIPTION OF THE DRAWINGS

FIG. 1 shows the association of a specific content, disc ID, and auxiliary information stored in a storage unit;

DESCRIPTION OF THE PREFERRED EMBODIMENTS

An object of the present invention is to make it possible to download via a network and efficiently manage an external content associated with a content recorded on a recording medium. Another object of the present invention is to provide a method that makes it possible to efficiently retrieve and reproduce an external content associated with such a recording medium even if a plurality of external contents are already downloaded in the same recording medium or even if one recording medium is replaced with another, by associating an external content with a recording medium.

Figure 2:
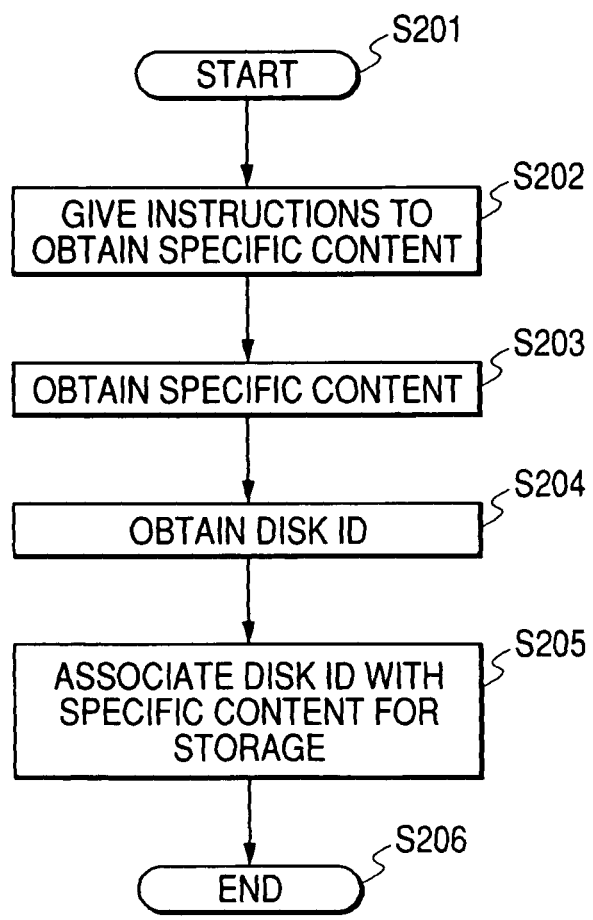
FIG. 2 is a flow chart showing the operation of a, control program according to a first embodiment of the present invention.

FIG. 2 is a flow chart showing an operation of a first embodiment for obtaining via a network a specific content associated with a, content recorded on a disc in a control program according to the present invention. In FIG. 2, S201 is a start step; S202, a specific content acquisition instruction step; S203, a specific content acquisition step; S204, a disc ID acquisition step; S205, a specific content storage step; and S206, an end step.

The flow chart of the program shown in FIG. 2 will be described below for each step.

Figure 5:
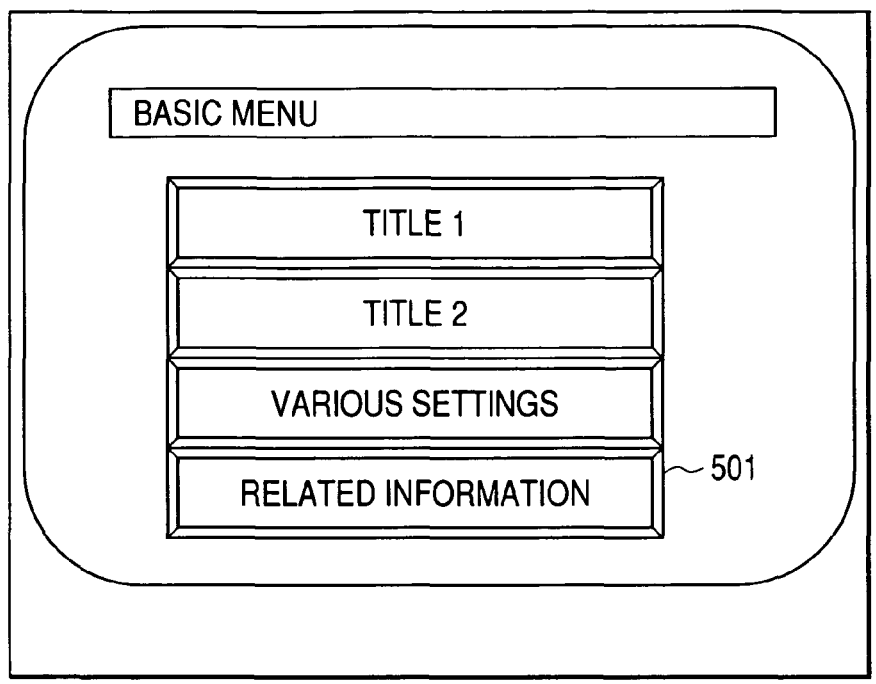
FIG. 5 is an example of a basic menu displayed on a screen.

The operation starts first at S201. At S202 the. program is executed according to instructions to obtain a specific content. Specifically, this is true of a case where a related information button 501 is selected by a user on a basic menu screen showing disc contents as shown in FIG. 5, for example and instructions are given to obtain specific information associated with a content recorded on a disc. The button is selected by the user by using a storage unit itself or a cursor key and an execution key available on a remote control and the like.

Figure 6:
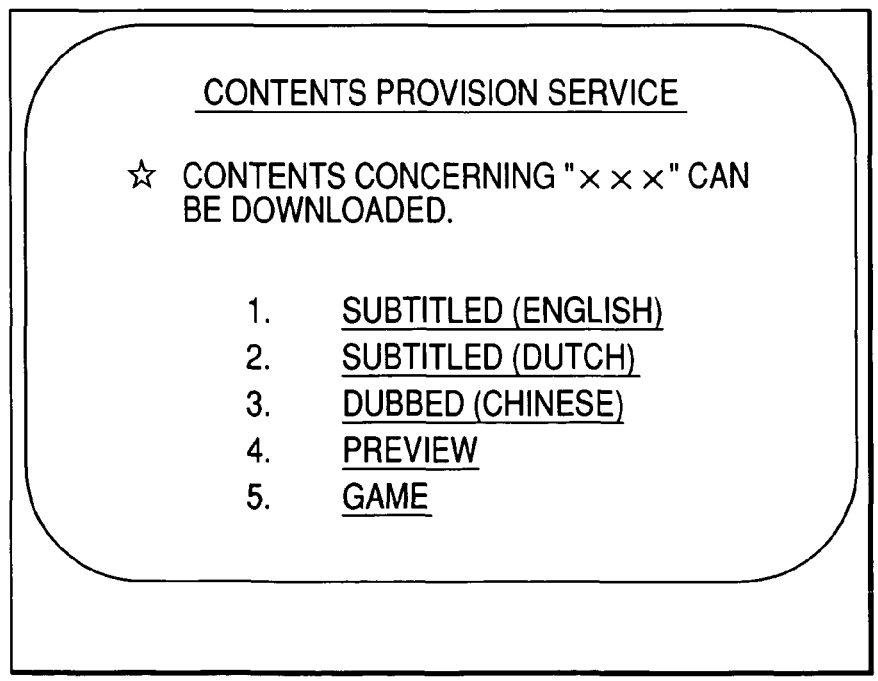
FIG. 6 is an example of a screen provided by a content provider.

A specific content is then obtained as information associated with a content recorded on the disc at S203. Specifically, an access is made to an address on a network that is set to a related information button 501 in FIG. 5, for example. FIG. 6 shows an example of a home page of a content provider that is displayed as a result of the access. A specific content is considered to be provided by a seller of a disc inserted into a reproducing apparatus or disc creator as part of a service associated with the purchase of the disc. However, there are no particular limits to a method for providing a specific content at this stage, whether free of charge or not, and the details of the content. The user can select and download a specific content the user likes.

When the specific content is downloaded, a disc ID is then obtained at S204. A specific method for obtaining a disc ID will be described later. A disc ID is used here. However, the information required is not limited one type of information so far as the information can be used to determine what type of disc the disc is or to determine what content is recorded in the disc. The disc ID obtained at S204 is given as an integer value of 10 digits, for example. Settings may be made so that every different disc. has a different ID or so that the disc has a different ID for each disc title.

The specific content downloaded is then stored in the memory in the reproducing apparatus at S205.

FIG. 1 shows an example of a method for storing a specific content that will be stored in a memory in a reproducing apparatus. It is shown that a disc ID is associated with each content and that each disc ID is stored together with a sign concerning the content of the disc and with text information. If, for example, a movie preview video clip is downloaded as a specific content E, a disc ID "3333333333", and auxiliary information such as "V", which is a sign of a video clip, "preview", which is text information showing what the specific content is about, are associated with the specific content for storage. However, auxiliary information such as a sign and text information is not limited to these types, but any type of information characterizing the details of a specific content is acceptable. A specific content shall be associated with at least a disc ID for storage.

The operation for obtaining a specific content then ends at S206. At the downloading step, however, a specific content can also be reproduced at the same time, depending on its details.

A reproducing apparatus according to an embodiment of the present invention will be described below.

Figure 3:
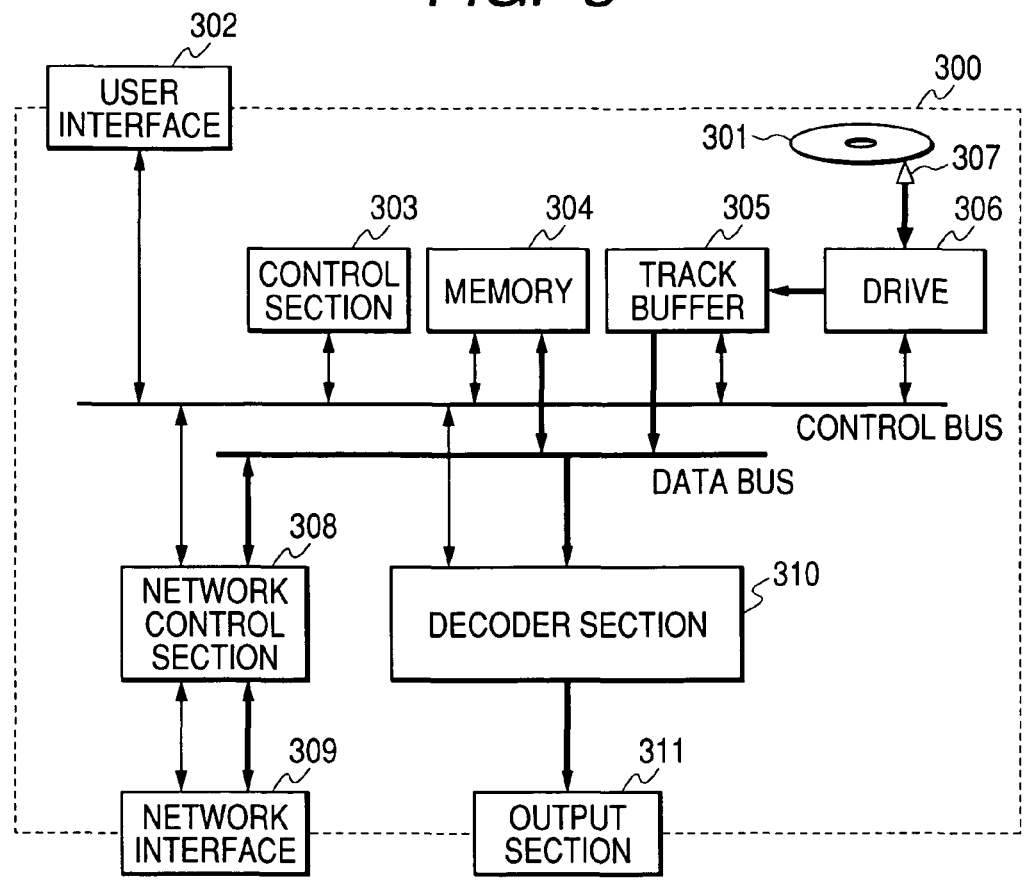
FIG. 3 is a block diagram of a reproducing apparatus.

FIG. 3 is a block diagram of the reproducing apparatus according to the present embodiment and shows the reproducing apparatus that uses an optical disc as a recording medium. Reference numeral 300 denotes a reproducing apparatus; 301, an optical disc; 302, a user interface; 303, a control section; 304, a memory; 305, a track buffer; 306, a drive; 307, a pickup; 308, a network control section; 309, a network interface; 310, a decoder section; and 311, an output section.

When initiating reproducing a specific content, a user inserts a desired optical disc 301 into a reproducing apparatus 300 and uses a remote control or a key on the reproducing apparatus to give instructions to reproduce the disc. The inputted instructions that the user has given. are interpreted by a control section 303, which then starts reproducing the optical disc 301.

The optical disc 301 has recorded thereon not only an audio-visual file such as images and audio but also play list file that shows a file reproduction order, a program file that handles a predetermined procedure and the like. To identify a file recorded on the optical disc 301 first, file management information is read out. Specifically, the control section 303 instructs the drive 306 to read out anchor information written in a predetermined sector and data in the predetermined sector is read out through the optical pickup 307. A location where the file management information is found and the file management information is read out. The file management information can be recorded, for example, by using a file system represented by a UDF (Universal Disc Format). Using a file system allows each information recorded on a disc to be handled as a file and a file identifier (file name) allows the designation of a file to be read out.

At the start of reproduction, a file designated by the management information file is read out. In this case, an initial startup program or a play list file for menu display may be read out. Specifically, the control section 303 reads out a designated file from the optical disc 301, at which step, the file is then processed according to information attached to the file showing that such a file is a play list file or a program, for example. In other words, if a file read out first is a file that corresponds to an initial startup program, the file has attached thereto the above-mentioned information showing that the file is a program and is processed according to the information. The control section 303 therefore executes the file read out first as a program. Specifically, a program read out to the storage area in the control section 303 is developed, then analyzed and then executed. For example, the aforementioned basic menu screen as shown in FIG. 5 may be displayed as information executed for an initial startup program. If the file read out first is a file that corresponds to a play list file, the control section 303 also analyzes the details of the file and displays the aforementioned basic menu screen as shown in FIG. 5.

A description will be made below of a procedure for reproducing not a content externally obtained but an internal content, that is, an audio-visual file recorded on the optical disc 301. If, for example, one of the title buttons is selected in FIG. 5, mentioned above, the control section 303 starts reproducing a predetermined stream data recorded on the optical disc 301. According to instructions given by the control section 303, the pickup 307 is first controlled from the optical disc 301 by the drive 306. A stream data is then read out from any data position and temporarily accumulated in the track buffer 305. The absorption of a difference between the transfer rate for the drive 306 and the encoding rate for the stream data is followed by the readout of the stream data from the track buffer 305. In the decoder section 310, image data and audio data are separated and decoded. In the output section 11, each of the two data is outputted in an appropriate signal form.

Note that besides a screen for reproducing such a file, a screen for providing an audio-visual file to the user is also outputted from the memory 304 or the network control section 308 through the decoder section 310 to the output section 311.

An operation for obtaining an external content will be described below. If the related information button 501 shown in FIG. 5 is selected by the user, the control section 303 reads out a program file specified therein from the optical disc 301 by performing the same procedure as is mentioned above. The file read out is recognized as a program by the control section 303. As with the aforementioned initial startup program, the details of the file are therefore executed sequentially. In this case, the execution of the program causes a predetermined address on a network to be designated. The control section 308 therefore passes the predetermined address to the network control section 308, which then interprets the address and accesses the predetermined address on the network through the network interface 309. Note that the description covers a case where the selection of the related information button 501 triggers the readout of a program file from the optical disc 301. However, the following configuration could also provide the same effect described above: a processing procedure that corresponds to a program is, as a reproducing apparatus, incorporated in the control section 303 from the beginning. The selection of the related information button 501 causes a predetermined address on a network to be directly designated.

When an access is made to the predetermined address on the network, a content provider's homepage screen as shown in FIG. 6 is displayed as mentioned above. The user then selects a desired content and gives instructions to download the content.

Figure 4:
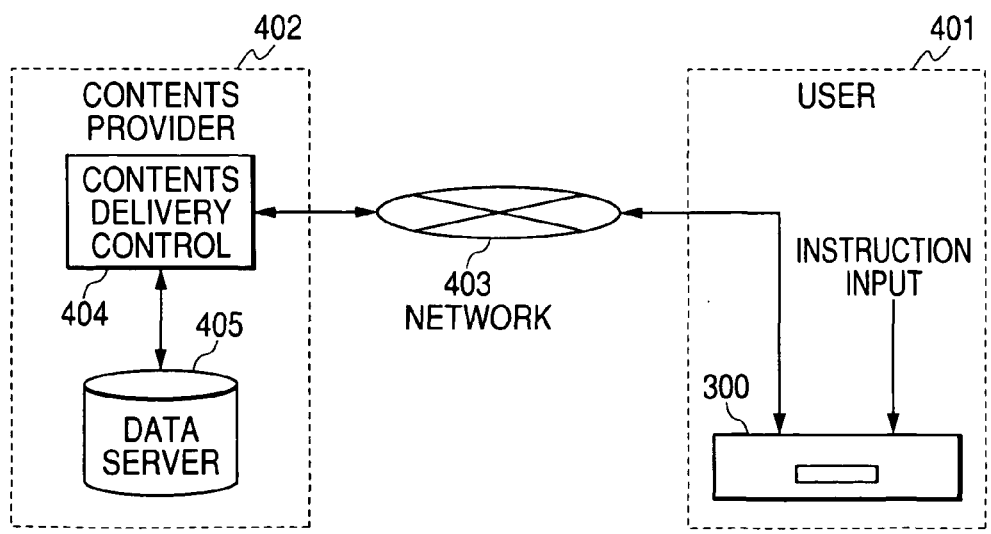
FIG. 4 shows a network connection.

The configuration of the network will be described below in a little more detail with reference to FIG. 4. FIG. 4 shows the schematic configuration of a user using a reproducing apparatus and a content provider present on a network. Reference numeral 401 denotes a user side; 402, a content provider side; 300, a reproducing apparatus shown in FIG. 3; 403, a network; 404, a content delivery control section; and 405, a data server.

If the user's instruction input causes a reproducing apparatus 300 to be given instructions to obtain a specific content, that is, if the user selects any of the contents shown in FIG. 6, the content delivery control section 404, on the content provider side 402, recognizes the details of the specific content and reads out data of interest from the data server 405 and delivers the data to the network 403. If the content provider wants to charge a content or limit the details of a content, the content delivery control section 404 is configured to perform a desired control operation.

At the step where the specific content has been downloaded, the control section 303 obtains a disc ID for an optical disc 301. Specifically, the control section 303 gives the drive 306 instructions to read out a disc identification number called a BCA (Burst Cutting Area). The drive 306 then reads out BCA information recorded in the optical disc 301 and sends the BCA information back to the control section 303. The BCA includes already digitalized and recorded information, information recorded in a disc such as a content creation maker, a title, a series name, a serial number and the like, each of which is used as a disc ID.

Note, as mentioned above, that although the BCA is used as a disc ID, the disc ID is not limited to the BCA if the disc ID is information that allows the discrimination of a disc, or information that allows the discrimination of a content recorded in a disc.

In the present embodiment, a procedure for obtaining a disc ID is performed after the step where the specific content is downloaded. However, a disc ID may be obtained prior to the downloading step, which does not lead to any particular problem.

After the disc ID is obtained, the specific content downloaded is associated as shown in FIG. 1 and stored in the memory 304. The details of signs and text information may be produced by the control section 303 based on the specific content downloaded or may be information prepared by the content delivery control section 404 and obtained according to the content. In addition, a format used for storing a content in the memory may be configured to show the details of information incidental on at least a given content, such as by producing a specific list file, by producing an additional information file for each content obtained, and the like.

Figure 7:
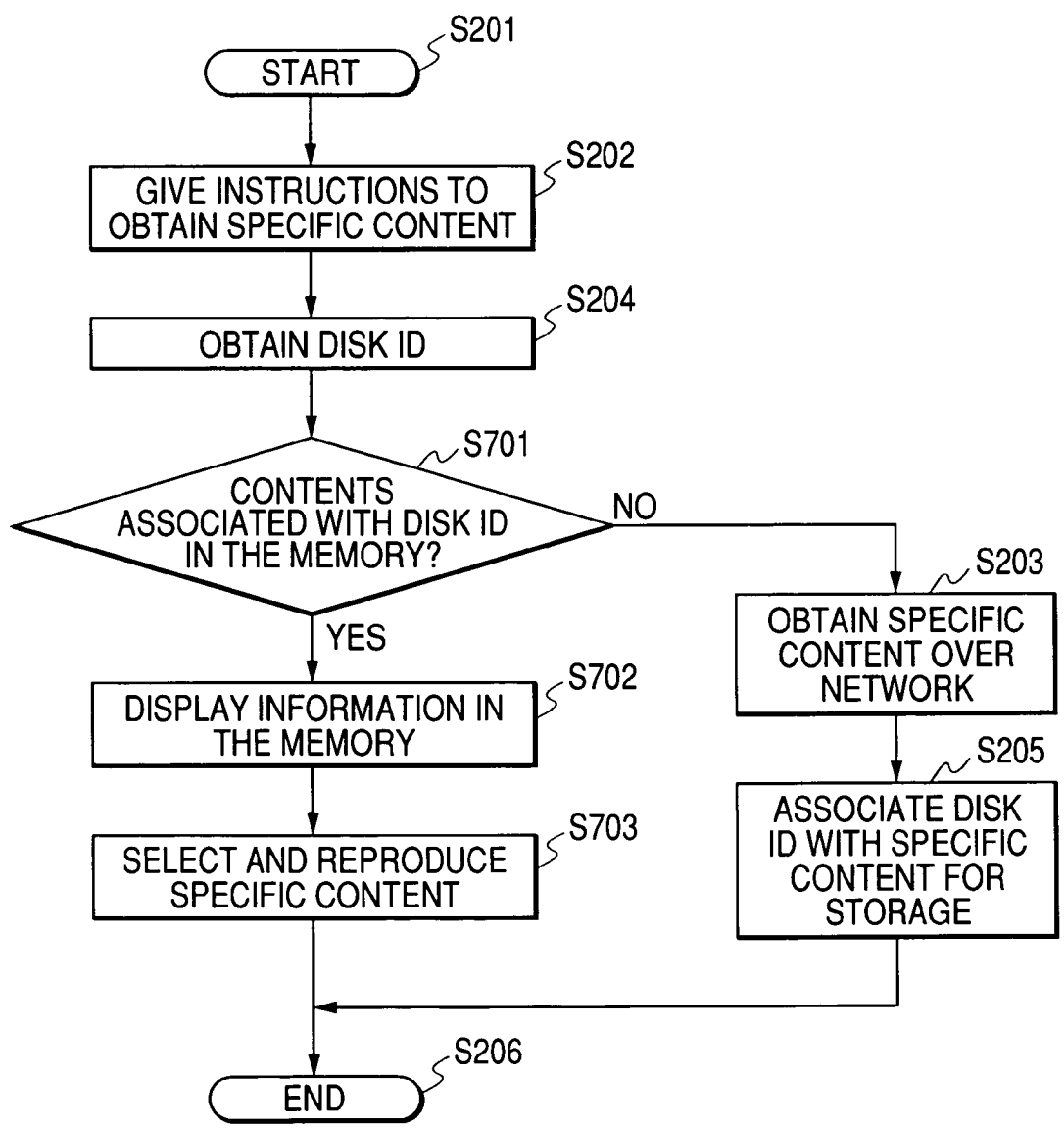
FIG. 7 is a flow chart showing the operation of the control program according to a second embodiment of the present invention.

FIG. 7 is a flow chart showing the operation of a control program according to a second embodiment of the present invention. As with the first embodiment, FIG. 7 shows an operation of the second embodiment for obtaining a specific content associated with a content recorded on a disc. Note that the parts in FIG. 7 that correspond to those in FIG. 2 will not be described in detail but use the same signs as in FIG. 2. S701 is a discrimination step; S702 an in-memory information display step; and S703, a specific information selection and reproduction step.

When instructions are given to obtain a specific content at S202, a disc ID, mentioned above, is first obtained at S204. At S701 the disc ID is then used to determine whether there is a specific content stored in the memory of a reproducing apparatus which is associated with the same disc ID in the form shown in FIG. 1. If no such specific content is stored in the memory, a similar procedure to that for the first embodiment is performed: the above-mentioned specific content is obtained on a network at S203. The specific content is then associated with the disc ID already obtained and stored in the memory at 205.

Figure 8:
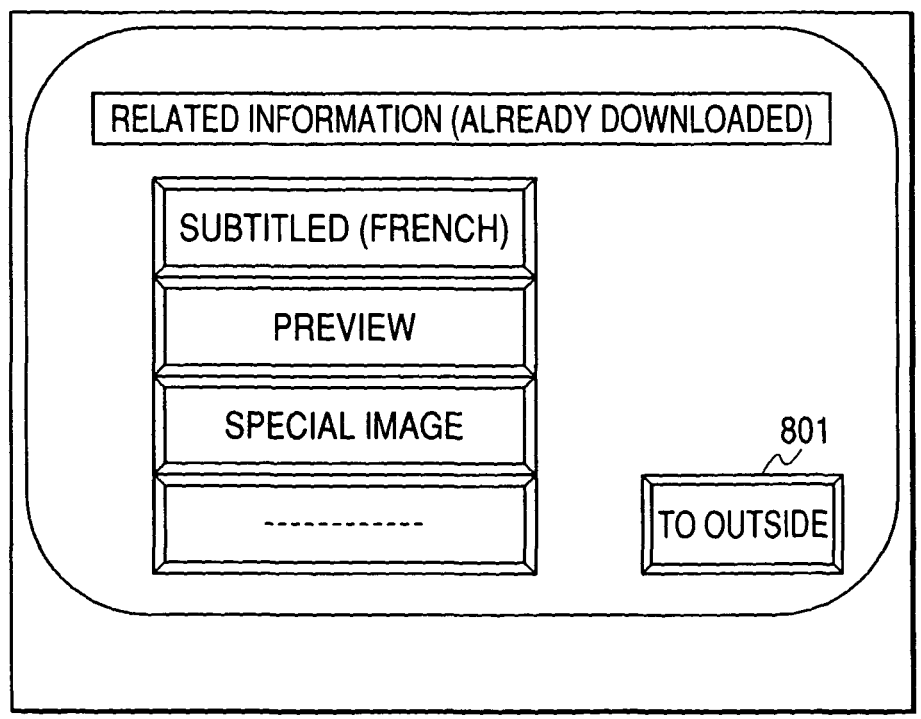
FIG. 8 is an example of a content list display screen.

If at S701, a discrimination step, any specific contents associated with the same disc ID as the one obtained are stored in the memory, all of these specific contents are listed at S702. These specific contents can be easily seen if they are listed in a form as shown in FIG. 8, for example. A written word displayed on each button is designed to correspond to text information shown in FIG. 1. In addition, an external access button 801 is provided, which allows an access to be made to an external network to obtain a specific content. If the external access button 801 is selected, the subsequent processing is performed in the same manner as in the specific content acquisition step S203 and after. If the user selects a desired specific content in FIG. 8, the specific content is reproduced as predetermined in response to the details of the specific content at S703.

As a reproducing apparatus according to the present embodiment, the control section 303 shown in FIG. 3 so operates as to control a series of processing after the discrimination step S701 and selects and reproduces a specific content stored in the memory 304.

According to the present embodiment, a specific content already downloaded can be selected and reproduced in response to a disc ID, thus making a reproducing apparatus look easier to use and reducing time and trouble required for downloading another specific content.

Figure 9:
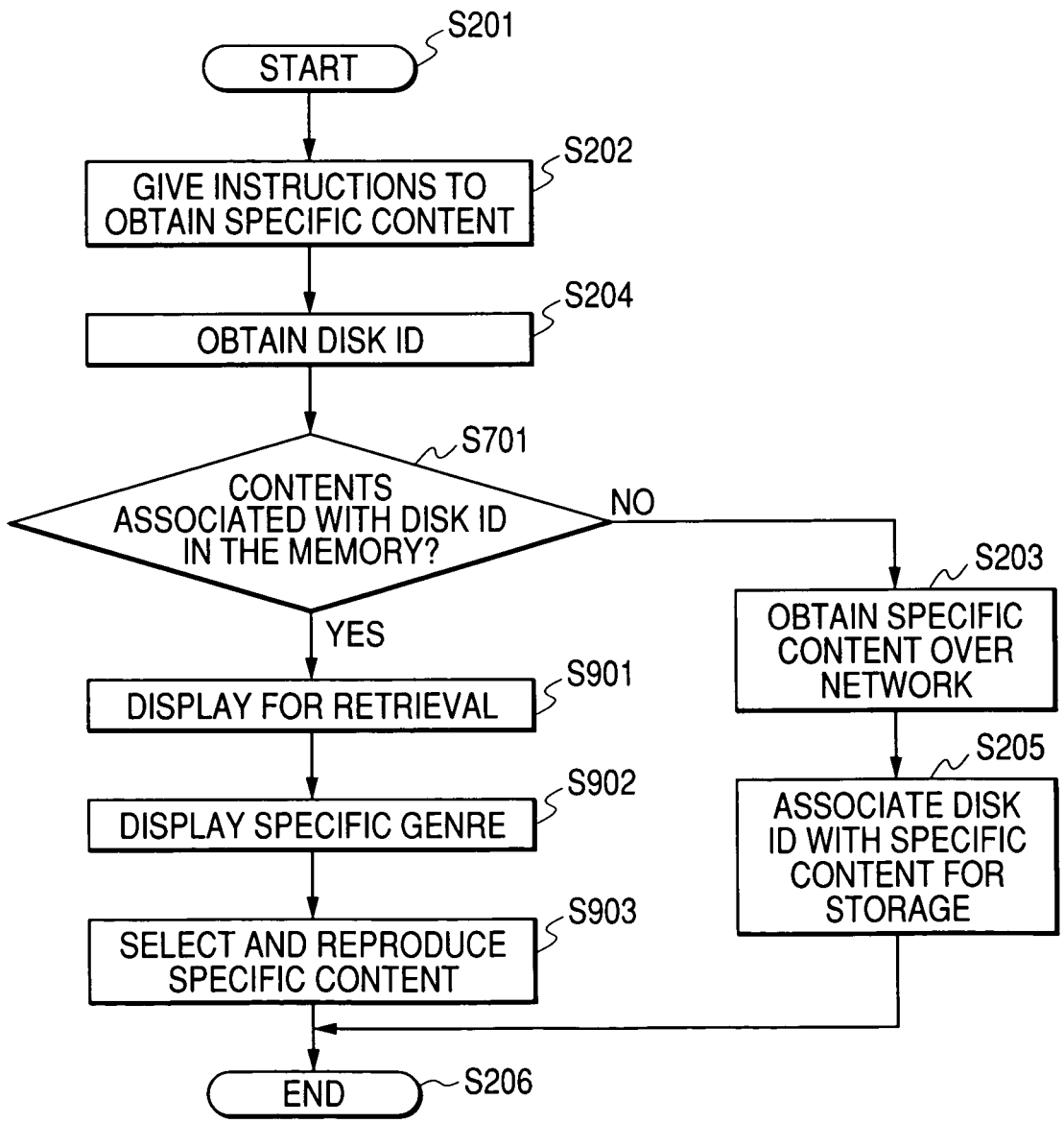
FIG. 9 is a flow chart showing the operation of the control program according to a third embodiment of the present invention.

FIG. 9 is a flow chart showing the operation of a control program according to a third embodiment of the present invention. As with the first and second embodiments, FIG. 9 shows an operation of the third embodiment for obtaining a specific content associated with a content recorded on a disc. Note that the parts in FIG. 9 that correspond to those in FIGS. 2 and 7 will not be described in detail but use the same signs as in FIGS. 2 and 7. S901 is a retrieval-intended display step for retrieval; S902, a predetermined genre display step; and S903, a specific content selection and reproduction step.

Figure 10:
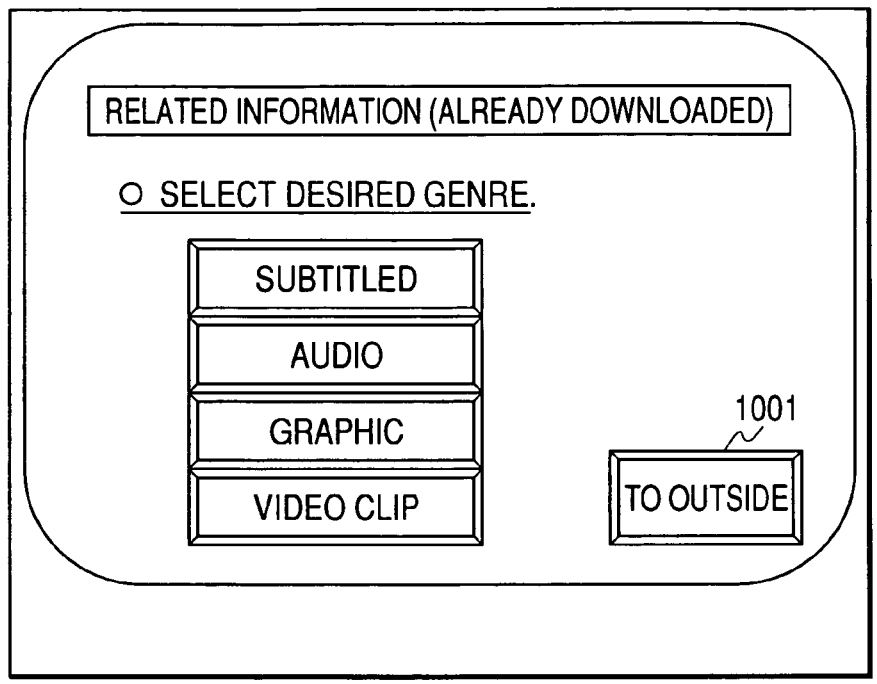
FIG. 10 is an example of a display screen for content retrieval.

If at the discrimination step S701 there is a specific content stored in the memory which is associated with the same disc ID as the disc ID obtained at the disc. ID acquisition step, S204, different types for the details of a specific content associated with that disc ID are listed at S901. These different types can be easily seen if they are listed in a form as shown in FIG. 10, for example. Displayed here is a classification based on the signs shown in FIG. 1 and a written word displayed on each button serves as an attribute assigned to a sign. In FIG. 1, for example, "S" refers to subtitle information; "A", audio information; and "V", a video clip. In this case, an external access button 1001 is also provided, as in FIG. 8. At this stage, the button also allows an access to be made an external network to obtain a specific content. If the external access button 1001 is selected, the subsequent processing is performed in the same manner as in the specific content acquisition step S203 and after.

Figure 11:
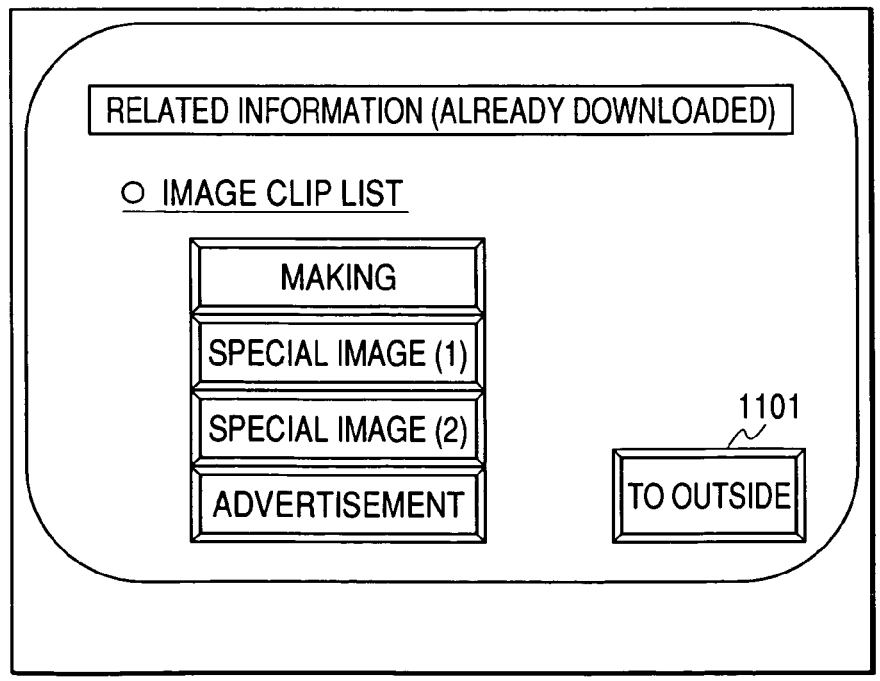
FIG. 11 is an example of a content list display screen.

If the user selects a desired genre in FIG. 10, specific contents classified into that genre are listed at 902. These specific files can easily be seen if they are displayed in a form as shown in FIG. 11, for example. In this case, a written word displayed on each button corresponds to text information shown in FIG. 1, as with in FIG. 8. In this case, an external access button 1101 is also provided, as in FIG. 8. At this stage, the button, also allows an access to be made an external network to obtain a specific content. If the external access button 1101 is selected, the subsequent processing is performed in the same manner as in the specific content acquisition step S203 and after. If the user selects a desired specific content in FIG. 11, a predetermined reproduction procedure is performed in response to the details of the specific content at S903.

As a reproducing apparatus according to the present embodiment, the control section 303 shown in FIG. 3, as with the second embodiment, so operates as to control a series of processing after the discrimination step S701 and selects and reproduces a specific content stored in the memory 304.

According to the present embodiment, a specific content already downloaded can be finalized in response to a disc ID and using auxiliary information stored in the memory makes it possible to efficiently retrieve a content classified into a desired genre.

Figures 12, 13:
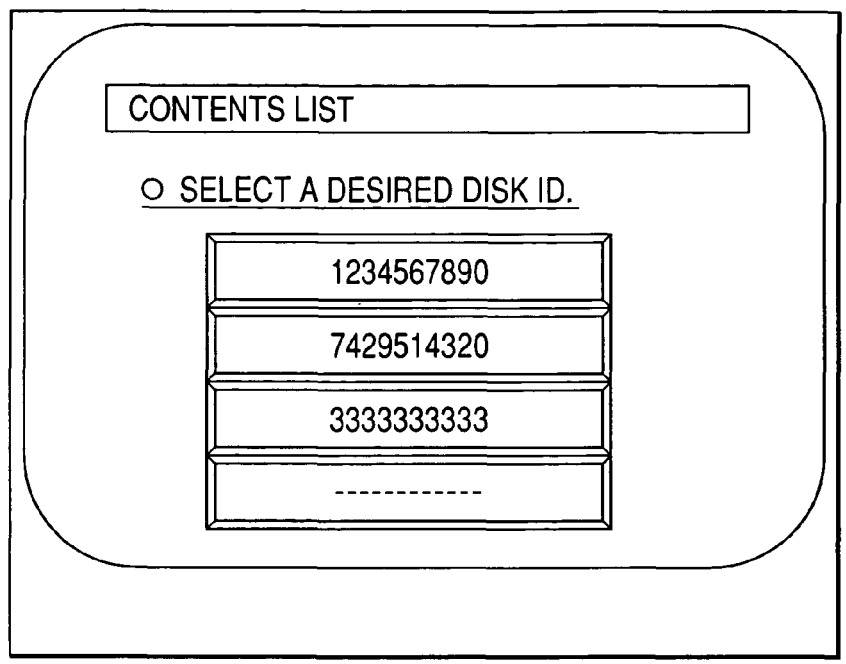
FIG. 12 is an example of a disc ID list display screen.
FIG. 13 shows the association of a specific content, a disc ID, and auxiliary information stored in a storage unit.

For a fourth embodiment of the present embodiment, its particular operational flow is not shown. With the activation of a reproducing apparatus, the present embodiment so operates as to display a screen as shown in FIG. 12, for example. In other words, even if the optical disc 301 is not inserted in FIG. 3, the control section 303 performs control in such a way to enable a specific content already downloaded to be reproduced in the memory 304.

In FIG. 12, a disc ID shown in FIG. 1 is displayed on each button. After the user selects a desired disc ID, the control program operates in the same manner as in the retrieval intended step S901 and the subsequent steps in FIG. 9, as described in the third embodiment.

If not numbers but disc titles are used for the above-mentioned disc ID in this case, the disc title itself is displayed on each button shown in FIG. 12, thus making it easier for the user to discriminate discs.

According to the present embodiment, specific contents accumulated in the memory can be retrieved and reproduced.

In each of the embodiments mentioned above, the memory for storing a specific content is not limited to a particular type. A type of memory that can be used in applications of the present invention does not raise particular problem, such as an HDD and a detachable semiconductor memory. In each of the embodiments mentioned above, the description has also been made the use of an optical disc as a recording medium. However, this is not the case. A wide variety of recording media can be applied.

According to the above embodiment, using a program, recording medium, and reproducing apparatus according to the present invention makes it possible to download via a network and efficiently manage an external content associated with a content recorded on the recording medium.

In addition, associating an external content with a recording medium and managing the content makes it possible to efficiently retrieve and reproduce the external content associated with the recording medium even if a plurality of external contents are downloaded on the same recording medium and even if one recording medium is replaced with another.

If a content already downloaded exists, a reproducing apparatus according to the present invention can reproduced the content even if a recording medium is not inserted. This saves the trouble of having to access a network and obtaining a content every time a recording medium is inserted into the reproducing apparatus, thus making it easier for the user to use the reproducing apparatus.

Figure 14:
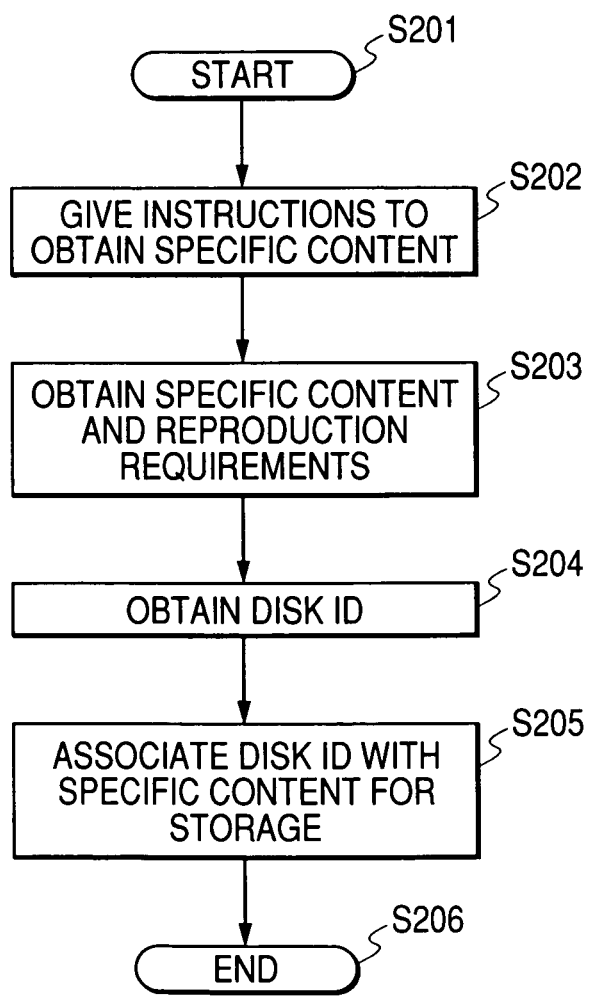
FIG. 14 is a flow chart showing an operation for downloading a content and a reproduction requirement for the control program according to another embodiment of the present invention.

FIG. 14 is a flow chart showing an operation for downloading via a network a specific content associated with a content recorded on a disc in a control program according to another embodiment of the present invention. In FIG. 14, S204 is a start step; S202, a specific content acquisition instruction step; S203, a specific content and reproduction requirement acquisition step;.S204, a disc ID acquisition step; S205, a specific content storage step; and S206, an end step.

The flow chart of the program shown in FIG. 14 will be described below for each step.

The operation starts first at S201. At S202 the program is executed according to instructions to obtain a specific content. Specifically, this is true of a case where a related information button 501 is selected by a user on a basic menu screen showing disc contents as shown in FIG. 5, for example and instructions are given to obtain specific information associated with a content recorded on a disc. The button is selected by the user by using a storage unit itself or a cursor key and an execution key available on a remote control and the like.

A specific content and a reproduction requirement (reproducible condition) are then obtained as information associated with a content recorded on the disc at S203. Specifically, an access is made to an address on a network that is set to a related information button 501 in FIG. 5, for example. FIG. 6 shows an example of a home page of a content provider that is displayed as a result of the access. A specific content is considered to be provided by a seller of a disc inserted into a reproducing apparatus or disc creator as part of a service associated with the purchase of the disc. However, there are no particular limits to a method for providing a specific content at this stage, whether free of charge or not, and the details of the content. The user can select and download a specific content the user likes. At step 203, information that serves as a reproduction requirement (reproducible condition) for a specific content is also downloaded at the same time and retained in the memory of the reproducing apparatus.

When the specific content is downloaded, a disc ID is then obtained at S204. A specific method for obtaining a disc ID will be described later. A disc ID is used here. However, the information required is not limited one type of information so far as the information can be used to determine what type of disc the disc is or to determine what content is recorded in the disc. The disc ID obtained at S204 is given as an integer value of 10 digits, for example. Settings may be made so that every different disc has a different ID or so that the disc has a different ID for each disc title. The specific content downloaded is then stored in the memory in the reproducing apparatus at S205.

FIG. 13 shows an example of a method for storing a specific content that will be stored in a memory in a reproducing apparatus. It is shown that a disc ID is associated with each content and that each disc ID is stored together with a sign concerning the content of the disc and with text information. If, for example, a movie preview video clip is downloaded as a specific content E, a disc ID "3333333333", and auxiliary information such as "V", which is a sign of a video clip, "preview", which is text information showing what the specific content is about, are associated with the specific content for storage. However, auxiliary information such as a sign and text information is not limited to these types, but any type of information characterizing the details of a specific content is acceptable. A specific content is associated with at least a disc ID for storage.

The operation for obtaining a specific content then ends at S206. At the downloading step, however, a specific content can also be reproduced at the same time, depending on its details.

A reproducing apparatus according to an embodiment of the present invention will be described below.

FIG. 3 is a block diagram of the reproducing apparatus according to the embodiment of the present invention and shows a reproducing apparatus that uses an optical disc as a recording medium. Reference numeral 300 denotes a reproducing apparatus; 301, an optical disc; 302, a user interface; 303, a control section; 304, a memory; 305, a track buffer; 306, a drive; 307, a pickup; 308, a network control section; 309, a network interface; 310, a decoder section; and 311, an output section.

When initiating reproducing a specific content, a user inserts a desired optical disc 301 into the reproducing apparatus 300 and uses a remote control or a key on the reproducing apparatus to give instructions to reproduce the disc. The inputted instructions that the user has given are interpreted by the control section 303, which then starts reproducing the optical disc 301.

The optical disc 301 has recorded thereon not only an audio-visual file such as images and audio but also play list file that shows a file reproduction order, a program file that handles a predetermined procedure and the like. To identify a file recorded on the optical disc 301 first, file management information is read out. Specifically, the control section 303 instructs the drive 306 to read out anchor information written in a predetermined sector and data in the predetermined sector is read out through the optical pickup 307. A location where the file management information is found and the file management information is read out. The file management information can be recorded, for example, by using a file system represented by a UDF (Universal Disc Format). Using a file system allows each information recorded on a disc to be handled as a file and a file identifier (file name) allows the designation of a file to be read out.

At the start of reproduction, a file designated by the management information file is read out. In this case, an initial startup program or a play list file for menu display may be read out. Specifically, the control section 303 reads out a designated file from the optical disc 301, at which step, the file is then processed according to information attached to the file showing that such a file is a play list file or a program, for example. In other words, if a file read out first is a file that corresponds to an initial startup program, the file has attached thereto the above-mentioned information showing that the file is a program and is processed according to the information. The control section 303 therefore executes the file read out first as a program. Specifically, a program read out to the storage area in the control section 303 is developed, then analyzed and then executed. For example, the aforementioned basic menu screen as shown in FIG. 5 may be displayed as information executed for an initial startup program. If the file read out first is a file that corresponds to a play list file, the control section 303 also analyzes the details of the file and displays the aforementioned basic menu screen as shown in FIG. 5.

A description will be made below of a procedure for reproducing not a content externally obtained but an internal content, that is, an audio-visual file recorded on the optical disc 301. If, for example, one of the title buttons is selected in FIG. 5, mentioned above, the control section 303 starts reproducing a predetermined stream data recorded on the optical disc 301. According to instructions given by the control section 303, the pickup 307 is first controlled from the optical disc 301 by the drive 306. A stream data is then read out from any data position and temporarily accumulated in the track buffer 305. The absorption of a difference between the transfer rate for the drive 306 and the encoding rate for the stream data is followed by the readout of the stream data from the track buffer 305. In the decoder section 310, image data and audio data are separated and decoded. In the output section 11, each of the two data is outputted in a appropriate signal form.

Note that besides a screen for reproducing such a file, a screen for providing an audio-visual file to the user is also outputted from the memory 304 or the network control section 308 through the decoder section 310 to the output section 311.

An operation for obtaining an external content will be described below. If the related information button 501 shown in FIG. 5 is selected by the user, the control section 303 reads out a program file specified therein from the optical disc 303 by performing the same procedure as is mentioned above. The file read out is recognized as a program by the control section 303. As with the aforementioned initial startup program, the details of the file is therefore executed sequentially. In this case, the execution of the program causes a predetermined address on a network to be designated. The control section 303 therefore passes the predetermined address to the network. control section 308, which then interprets the address and accesses the predetermined address on the network through the network interface 309. Note that the description covers a case where the selection of the related information button 501 triggers the readout of a program file from the optical disc 301. However, the following configuration could also provide the same effect described above: a processing procedure that corresponds to a program is as a reproducing apparatus, incorporated in the control section 303 from the beginning. The selection of the related information button 501 causes a predetermined address on a network to be directly designated.

When an access is made to the predetermined address on the network, a content provider's homepage screen as shown in FIG. 6 is displayed as mentioned above. The user then selects a desired content and gives instructions to download the content.

A reproduction requirement (reproducible condition) is then shown for each content. As shown in FIG. 13, for example, reproduction requirements are available in the following types: unlimitedly reproducible (unrestraint), reproduction number limited, reproduction period limited, and reproducible discs limited (specified disc). For the reproduction requirement unlimitedly reproducible, a content downloaded can be reproduced when the user desires to reproduce the content. For reproduction number limited, a content downloaded can be reproduced only a specified number of times. For reproduction period limited, a content downloaded can be reproduced unlimitedly only for a specified period of time starting on the date where the content is downloaded. For reproducible discs limited, reproducing a content downloaded requires a disc having a specified disc ID to be placed in a reproducing apparatus in advance. If the reproducing apparatus recognizes the disc having the specified disc ID, the content downloaded can be reproduced unlimitedly.

The configuration of the network will be described below in a little more detail with reference to FIG. 4. FIG. 4 shows the schematic configuration of a user using a reproducing apparatus and a content provider present on a network. Reference numeral 401 denotes a user side; 402, a content provider side; 300, a reproducing apparatus shown in FIG. 3; 403, a network; 404, a content delivery control section; and 405, a data server.

If the user's instruction input causes a reproducing apparatus 300 to be given instructions to obtain a specific content, that is, if the user selects any of the contents shown in FIG. 6, the content delivery control section 404, on the content provider side 402, recognizes the details of the specific content and reads out data of interest from the data server 405 and delivers the data to the network. 403. If the content provider wants to charge a content or limit the details of a content, the content delivery control section 404 is configured to perform a desired control operation.

At the step where the specific content and its reproduction requirement have been downloaded, the control section 303 obtains a disc ID for an optical disc 301. Specifically, the control section 303 gives the drive 306 instructions to read out a disc identification number called a BCA (Burst Cutting Area). The drive 306 then reads out BCA information recorded in the optical disc 301 and sends the BCA information back to the control section 303. The BCA includes already digitalized and recorded information, information recorded in a disc such as a content creation maker, a title, a series name, a serial number and the like, each of which is used as a disc ID.

Note, as mentioned above, that although the BCA is used as a disc ID, the disc ID is not limited to the BCA if the disc is information that allows the discrimination of a disc, or information that allows the discrimination of a content recorded in a disc.

In the present embodiment, a procedure for obtaining a disc ID is performed after the step where the specific content is downloaded. However, a disc ID may be obtained prior to the downloading step, which does not lead to any particular problem.

After the disc ID is obtained, the specific content downloaded and its reproduction requirement (reproducible condition) are associated as shown in FIG. 13 and stored in the memory 304. The details of signs and text information may be produced by the control section 303 based on the specific content downloaded or may be information prepared by the content delivery control section 404 and obtained according to the content. In addition, a format used for storing a content in the memory may be configured to show the details of information incidental on at least a given content, such as by producing a specific list file, by producing an additional information file for each content obtained, and the like.

Figure 15:
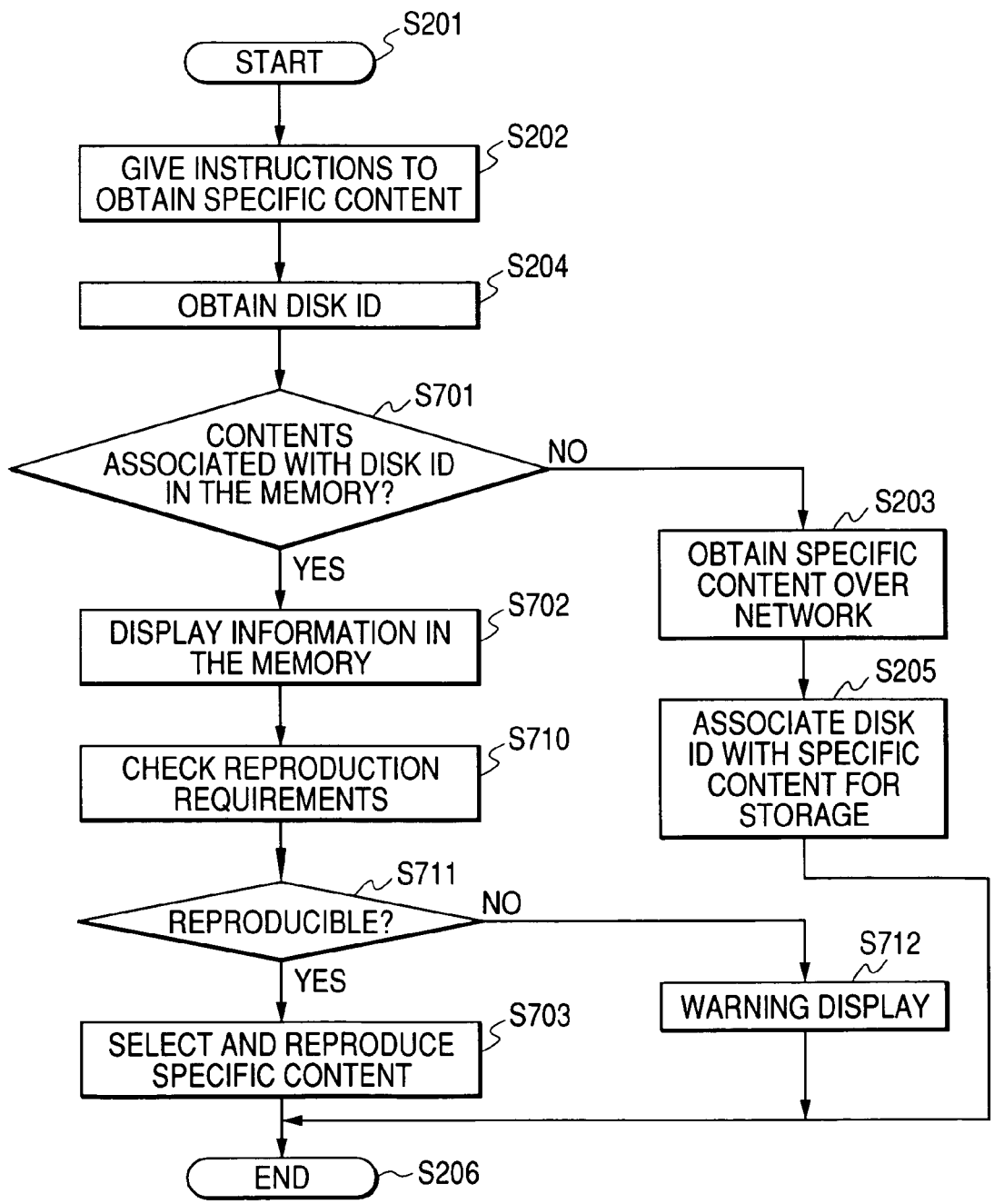
FIG. 15 is a flow chart showing an operation for checking a reproduction requirement for the control program according to another embodiment of the present invention.

FIG. 15 is a flow chart showing the operation of a control program. As with the first embodiment, FIG. 15 shows an operation for obtaining a specific content associated with a content recorded on a disc. Note that the parts in FIG. 15 that correspond to those in FIG. 14 will not be described in detail but use the same signs as in FIG. 14. S701 is a discrimination step; S702, an in-memory information display step; and S703, a specific information selection and reproduction step.

When instructions are given to obtain a specific content at S202, a disc ID, mentioned above, is first obtained at S204. At S701 the disc ID is then used to determine whether there is a specific content stored in the memory of a reproducing apparatus which is associated with the same disc ID in the form shown in FIG. 1. If no such specific content is stored in the memory, a similar procedure to that for the first embodiment is performed: the above-mentioned specific content and its reproduction requirement are obtained on a network at S203. The specific content is then associated with the disc ID already obtained and stored in the memory at 205.

Figure 16:
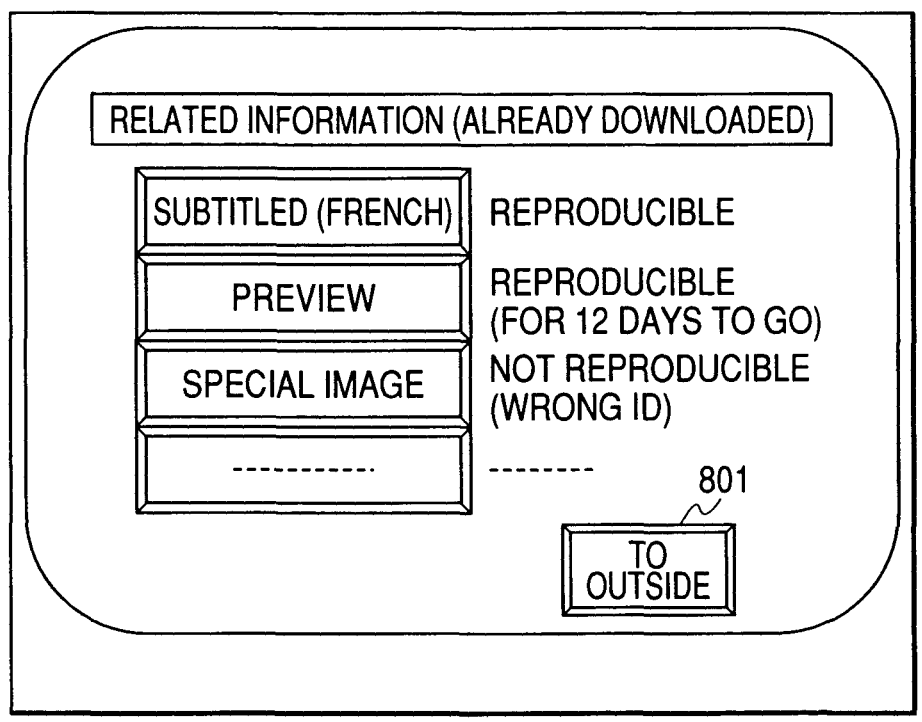
FIG. 16 shows an example of a content list display screen.

If at S701, a discrimination step, any specific content associated with the same disc ID as the one obtained are stored in the memory, all of these specific contents and their reproduction requirements (reproducible conditions) are listed at S702. These specific contents can be easily seen if they are listed in a form as shown in FIG. 16, for example. A written word displayed on each button is designed to correspond to text information shown in FIG. 13. In addition, an external access button 801 is provided, which allows an access to be made to an external network to obtain a specific content. If the external access button 801 is selected, the subsequent processing is performed in the same manner as in the specific content acquisition step S203 and after. If the user selects a desired specific content in FIG. 16, a checking is made on the reproduction requirement (reproducible condition) for the specific content at S710. If the checking shows, at S711, that the specific content is not reproducible, the user is informed to that effect at S712. The process then return to S702, the in-memory information display step. If the checking shows, at S711, that the specific content is reproducible, the specific content is reproduced as predetermined in response to the details of the specific content at S703.

As a reproducing apparatus according to the present embodiment, the control section 303 shown in FIG. 3 so operates as to control a series of processing after the discrimination step S701 and selects and reproduces a specific content stored in the memory 304.

Figure 17:
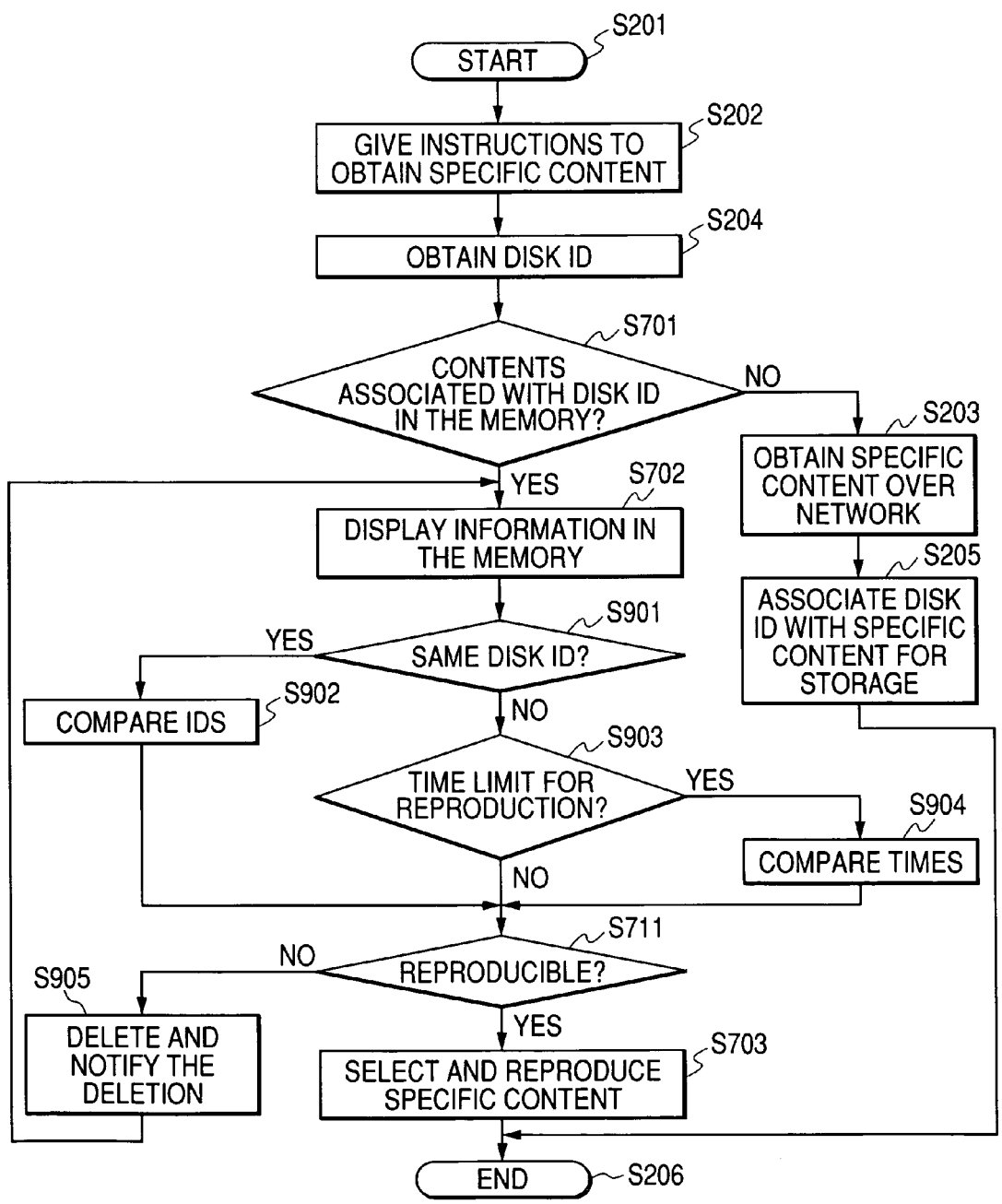
FIG. 17 is a flow chart showing an operation for deleting a reproduction requirement and a content for the control program according to another embodiment of the present invention.

FIG. 17 is a flow chart showing a procedure for determining a reproduction requirement (reproducible condition) and deleting an external content.

Note that the parts in FIG. 17 that correspond to those in FIG. 15 will not be described in detail but use the same signs as in FIG. 15.

After in-memory information is displayed at the step S702, a reproduction requirement (reproducible condition) is checked. The reproduction requirement is determined by comparing disc IDs at S901. A determination is made as to whether disc IDs coincide with each other. If disc IDs coincide with each other as a reproduction requirement, a disc ID held in the memory when an external content is, at S902, compared with a disc ID obtained at the step S204. If these disc IDs coincide with each other, it is determined, at S711, that the external content is reproducible. If not, it is determined, at S711, that the external content is not reproducible. If disc IDs do not coincide with each other as the reproduction requirement, a determination is made at S903 as to whether the external content is on a time limit for reproduction. If the external content is within a time limit as a reproduction requirement, a determination is made at S904 as to whether the current time is within a time limit set to the external content starting from the date when the content was downloaded. If the current time is within the time limit, the external content is determined as reproducible at S711. If not, the external content is determined as not reproducible at S711. If disc IDs do not coincide with each other as a reproduction requirement, no particular reproduction requirements are specified. The external content is therefore regarded as unlimitedly reproducible at S711. If the external content is determined as reproducible at S711, the external content is reproduced as predetermined in response to the details thereof at S703. If the external content is determined as not reproducible at S711, the content is deleted and the user is informed to that effect at S905. The process then return to the in-memory information display step, S702.

As a reproducing apparatus according to the present embodiment, the control section 303 shown in FIG. 3 so operates as to control a series of processing after the step S701 and delete the specific content and its reproduction requirement (reproducible condition) stored in the memory 304.

Note that although the above description covers a program for determining a reproduction requirement (reproducible condition) and deleting an external content and a reproducing apparatus incorporated in advance, the above deletion program may be included as one reproduction requirement downloaded together with an external content. In this case, it is detected, at the reproduction requirement checking steps in FIG. 17, such as S901 and S903, that a reproduction requirement includes a program. The subsequent processing is performed by using the program. This allows a reproduction control intended by a content creator to be performed without depending on a reproduction requirement determination program in a reproducing apparatus.

In addition, disc ID coincidence and a time limit for reproduction have been shown as an example of a reproduction requirement. However, a reproduction requirement is not limited to these items. There are also other methods available for using as a reproduction. requirement a limited number of content reproductions and a combination of a plurality of reproduction requirements.

To secure some free space in the memory of a reproducing apparatus, if there is a desire to give priority to the deletion of an external content stored in the memory, it is also feasible by providing a step for selecting whether to delete a selected content directly after step S702, and making it possible to delete the. selected content irrespective of whether the content meets a reproduction requirement or not.

According to the present embodiment, an external content and a reproduction requirement therefor are downloaded at the same time, thus allowing the reproduction control intended by a content creator and therefore a proper copyright management. In addition, an external content that is not reproducible is automatically deleted from the memory, thus making it possible to make an effective use of the memory without occupying the memory wastefully.

In the above embodiments, the memory for storing a specific content has not been limited to any particular type. A type of memory that can be used in applications of the present invention does not raise particular problem, such as an HDD and a detachable semiconductor memory. In each of the embodiments mentioned above, the description has also been made the use of an optical disc as a recording medium. However, this is not the case. A wide variety of recording media can be applied.

According to a program, a recording medium, and a reproducing apparatus according to the each of the above embodiments, an external content and a reproduction requirement therefor are downloaded at the same this thus allowing the reproduction control intended by a content creator and therefore a proper copyright management.

In addition, an external content that is not reproducible is automatically deleted from the memory, thus making it possible to make an effective use of the memory without occupying the memory wastefully.

What is claimed is:

1. An information obtaining and reproducing device, which can download data via a network from an external server comprising:
a storage device configured to store a plurality of identification information of audio and/or video data, which are obtained from a plurality of recording media being purchased by a user as a first obtaining route, not being downloaded via a network from the external server;
a display device configured to display a list of specific audio and/or video data which are downloadable from the external server via a network, each of the specific audio and/or video data being associated with the stored plurality of identification information;
an obtaining unit configured to obtain specific audio and/or video data by downloading from the external server via a network as a second obtaining route which is different from the first obtaining route;
reproducer configured to reproduce the obtained specific audio and/or video data; and
a controller,
wherein the controller configured to control,
when one of the listed specific audio and/or video data associated with arbitrary identification information is selected,
to obtain the selected specific audio and/or video data by the obtaining unit,
to store the obtained specific audio and/or video data in connection with the arbitrary identification information, and
to display the stored specific audio and/or video data as distinguished from unobtained specific audio and/or video data and an icon for obtaining unobtained specific audio and/or video data by the display device, and
when the icon is selected,
to newly obtain the specific audio and/or video data by the obtaining unit.

2. The information obtaining and reproducing device according to claim 1,
the specific audio and/or video data, which are obtained from the external server via the second obtaining route, become obtainable as a part of service to the user who has purchased the recording media obtained via the first obtaining route.

3. An information obtaining and reproducing device, which can download data via a network from an external server comprising:
a storage device configured to store a plurality of identification information of audio and/or video data and incidental information related to the specific audio and/or video data, which are obtained from a plural recording media being purchased by a user as a first obtaining route, not being downloaded via a network from the external server;
a display device configured to display a list of specific audio and/or video data and incidental information related to the specific audio and/or video data, which are downloadable from the external server via a network, each of the specific audio and/or video data being associated with the stored plurality of identification information;
an obtaining unit configured to obtain specific audio and/or video data and incidental information related to the specific audio and/or video data by downloading from the external server via a network as a second obtaining route which is different from the first obtaining route;
a memory unit configured to store the specific audio and/or video data and the incidental information related to the specific audio and/or video data in connection with the arbitrary identification information;
a reproducer configured to reproduce the obtained specific audio and/or video data stored by the memory unit; and
a controller,
wherein the controller configured to control,
when one of the listed specific audio and/or video data associated with arbitrary content identification information is selected, to obtain the selected specific audio and/or video data and the incidental information related to the selected specific audio and/or video data by the obtaining unit, to display the stored specific audio and/or video data and the obtained incidental information as distinguished from unobtained specific audio and/or video data and the unobtained incidental information and an icon for obtaining unstored specific audio and/or video data by the display device, and when the icon is selected from the list including unstored specific audio and/or video data, to newly obtain the specific audio and/or video data and incidental information related to the newly obtained specific audio and/or video data by the obtaining unit.

4. The information obtaining and reproducing device according to claim 3, wherein the controller is configured to control to store the newly obtained specific audio and/or video data and the newly obtained incidental information in connection with the arbitrary identification information by the memory unit and to display the updated list including the newly stored specific audio and/or video data by the display device.

5. The information obtaining and reproducing device according to claim 3, the specific audio and/or video data, which are obtained from the external server via the second obtaining route, become obtainable as a part of service to the user who has purchased the recording media obtained via the first obtaining route.

6. An information obtaining and reproducing method, which can download data via a network from an external server comprising the steps of:

obtaining specific audio and/or video data via a network, each of the specific audio and/or video data being associated with arbitrary identification information obtained from a recording medium being purchased by a user as a first obtaining route, not being downloaded via a network from the external server;

displaying a list of the specific audio and/or video data which is able to be obtained; and reproducing audio and/or video data obtained from the recording medium or the specific audio and/or video data, wherein, when one of the listed specific audio and/or video data associated with arbitrary identification information is selected, obtaining the selected specific audio and/or video data via the network as a second obtaining route which is different from the first obtaining route, storing the obtained specific audio and/or video data in connection with the arbitrary identification information, displaying the stored specific audio and/or video data as distinguished from unobtained specific audio and/or video data and an icon for obtaining unobtained specific contents, and when the icon is selected, newly obtaining the specific audio and/or video data via the network.

7. The information obtaining and reproducing device according to claim 6, the specific audio and/or video data, which are obtained from the external server via the second obtaining route, become obtainable as a part of service to the user who has purchased the recording media obtained via the first obtaining route.

8. An information obtaining and reproducing method, which can download data via a network from an external server comprising the steps of:

obtaining specific audio and/or video data and incidental information related to the specific audio and/or video data via a network, each of the specific audio and/or video data being associated with arbitrary identification information obtained from a recording medium being purchased by a user as a first obtaining route, not being downloaded via a network from the external server;

displaying a list of the specific audio and/or video data which is able to be obtained;

storing the specific audio and/or video data and the incidental information related to the specific audio and/or video data in connection with the arbitrary identification information; and reproducing audio and/or video data obtained from the recording medium or the stored specific audio and/or video data, wherein, when one of the listed specific audio and/or video data associated with arbitrary identification information is selected, obtaining the selected specific audio and/or video data and the incidental information related to the selected specific audio and/or video data via the network as a second obtaining route which is different from the first obtaining route, displaying the stored specific audio and/or video data and the stored incidental information as distinguished from unobtained specific audio and/or video data and an icon for obtaining unstored specific audio and/or video data, and when the icon is selected, to newly obtain the specific audio and/or video data and incidental information related to the newly obtained specific audio and/or video data via the network.

9. The information obtaining and reproducing method according to claim 8, wherein the newly obtained specific audio and/or video data and the newly obtained incidental information are stored in connection with the arbitrary identification information and the updated list including the newly stored specific audio and/or video data is displayed.

10. The information obtaining and reproducing device according to claim 8, the specific audio and/or video data, which are obtained from the external server via the second obtaining route, become obtainable as a part of service to the user who has purchased the recording media obtained via the first obtaining route.

* * * * *